United States Patent [19]

Bognaes et al.

[11] E Re. 29,424

[45] Reissued Oct. 4, 1977

[54] TANK CONSTRUCTION FOR LIQUIFIED AND/OR COMPRESSED GAS

[75] Inventors: Ragnar Bognaes, Jeloy; Olav Solberg, Oslo, both of Norway

[73] Assignee: Kvaerner Brug AS, Oslo, Norway

[21] Appl. No.: 752,896

[22] Filed: Dec. 21, 1976

Related U.S. Patent Documents

Reissue of:

[64] Patent No.: 3,677,021
Issued: July 18, 1972
Appl. No.: 81,102
Filed: Oct. 15, 1970

[51] Int. Cl.[2] ..... F17C 13/08

[52] U.S. Cl. ..... 62/55; 114/74 A; 220/15

[58] Field of Search ..... 62/45, 55, 240; 114/74 A; 220/9 LG, 15

[56] References Cited

U.S. PATENT DOCUMENTS

| | | | |
|---|---|---|---|
| 1,806,508 | 5/1931 | Smith | 114/74 A |
| 2,363,992 | 11/1944 | Reiser | 248/194 A |
| 2,417,053 | 3/1947 | Boardman | 220/1 |
| 2,523,274 | 9/1950 | Boardman | 248/146 |
| 2,690,273 | 9/1954 | Arne | 220/1 |
| 2,769,563 | 11/1956 | Weil | 220/9 LG |
| 2,901,592 | 8/1959 | Rossheim | 219/137 |
| 2,926,810 | 3/1960 | Yeager | 220/15 |
| 2,955,723 | 10/1960 | McGrath | 220/20.5 |
| 2,993,460 | 7/1961 | Dreyer | 114/74 A |
| 3,011,321 | 12/1961 | Clauson | 62/45 |
| 3,037,657 | 6/1962 | Hampton et al. | 220/15 |
| 3,087,883 | 4/1963 | Hafke | 204/193.2 |
| 3,114,344 | 12/1963 | Meade | 114/74 A |
| 3,129,836 | 4/1964 | Frevel | 220/1 |
| 3,155,265 | 11/1964 | Reese | 220/15 |
| 3,224,623 | 12/1965 | Knox, Jr. et al. | 220/9 L G |
| 3,276,412 | 10/1966 | Estes et al. | 114/74 A |
| 3,280,778 | 10/1966 | Leathard | 114/74 A |
| 3,280,779 | 10/1966 | Breit, Jr. | 114/74 A |
| 3,295,791 | 1/1967 | Black | 220/15 |
| 3,331,525 | 7/1967 | Coehn | 220/15 |
| 3,355,135 | 11/1967 | Benetsson | 248/350 |
| 3,380,611 | 4/1968 | Brougham et al. | 220/15 |
| 3,403,651 | 10/1968 | Gilles | 114/74 A |
| 3,422,779 | 1/1969 | Becker | 114/74 A |
| 3,428,205 | 2/1969 | Basile et al. | 220/15 |
| 3,507,242 | 4/1970 | Ulbricht | 114/74 A |
| 3,671,315 | 6/1972 | Iarossi | 114/74 A |

FOREIGN PATENT DOCUMENTS

| | | |
|---|---|---|
| 1,250,289 | 9/1967 | Germany |
| 1,029,254 | 4/1958 | Germany |
| 15,133 | 6/1959 | Japan |
| 102,309 | 5/1958 | Norway |
| 399,518 | 10/1933 | United Kingdom |
| 476,713 | 12/1937 | United Kingdom |
| 612,973 | 11/1948 | United Kingdom |
| 802,709 | 10/1958 | United Kingdom |
| 818,073 | 8/1959 | United Kingdom |
| 820,037 | 9/1959 | United Kingdom |
| 910,224 | 11/1962 | United Kingdom |
| 959,166 | 5/1964 | United Kingdom |
| 1,000,297 | 8/1965 | United Kingdom |
| 1,058,206 | 2/1967 | United Kingdom |
| 1,175,323 | 12/1969 | United Kingdom |
| 1,179,368 | 1/1970 | United Kingdom |
| 1,179,369 | 1/1970 | United Kingdom |
| 1,205,780 | 9/1970 | United Kingdom |

OTHER PUBLICATIONS

Comm. Report, Amer. Welding Society; "*Fabrication of Welded Rocket Motor Cases,*" 1961, pp. 23 & 26.

Schimpke, P. U. Horn; H. A. Praktisches Auslage Band 3, 1951, Springer-Verlag, Berlin/Goiting en/Heidelberg, pp. 291-324.

Marine Engineering/Log 8/1961, pp. 56-59 & 70.

Principles of Naval Architecture, P201, Society of Naval Architects & Marine Engr. 1939.

Code of Fed. Regulations, Title 46, pp. 260, 1, 453.

*Primary Examiner*—Ronald C. Capossela

*Attorney, Agent, or Firm*—Harold L. Stults; Pasquale A. Razzano

[57] ABSTRACT

In a marine vessel for transporting or storing a cargo tank adapted to contain liquified and/or compressed gas which tank is mounted on supporting structure connected to the hull of the vessel, the tank has a peripheral integral interface structure such that the exterior periphery of the interface structure extends beyond the periphery of adjacent portions of the tank to define an extension member which is adapted to be rigidly secured to the tank support structure.

17 Claims, 6 Drawing Figures

INVENTORS
Ragnar Bognaes
Olav Solberg
BY
Curtis, Morris & Safford
ATTORNEYS

INVENTORS
Ragnar Bognaes
Olav Solberg
BY
Curtis, Morris & Safford
ATTORNEYS

INVENTORS
Ragnar Bognaes
Olav Solberg
BY
Curtis, Morris & Safford
ATTORNEYS

TANK CONSTRUCTION FOR LIQUIFIED AND/OR COMPRESSED GAS

Matter enclosed in heavy brackets [ ] appears in the original patent but forms no part of this reissue specification; matter printed in italics indicates the additions made by reissue.

This invention relates to the storage and transportation of liquified and/or compressed gas (hereinafter referred to simply as "liquified gas") in a cargo tankship, and more particularly to an apparatus for supporting the cargo tank in the hull structure of the vessel.

The safe and efficient storage of liquified natural gas, as for example, liquified methane at −260° F, has presented numerous problems to the shipbuilding industry. These problems arise from various sources, and in particular form the static and dynamic movements, deflections, and deformations of the vessel structure in response to cargo loading and wind and wave forces, as well as from stresses produced by the extreme temperature variations in the tank during loading and unloading, which extremes cause severe thermal expansions and contractions of the tank structure. The various stresses produced by these forces are transmitted between the vessel hull structure and the tank through the supporting system for the tank.

Because of these severe problems certain regulatory and classifications agencies not maintain specific regulations with regard to the marine transportation of liquified gas. As a result, numerous special mounting systems have previously been proposed for shipboard application to liquified gas carriers in order to conform to these regulations and to safely and efficiently transport this type of cargo. One such method presently in use is to contain the liquified gas in a double walled tank, which tank system is resiliently supported in the vessel to minimize transferences of stresses from the hull structure to the tank itself and to accommodate small relative motions between the hull and tanks, or caused by temperature and strain differences. Such arrangements are excessively expensive to build in that duplicate tank systems are required and the supporting structure is relatively complex. Further, construction of the tank is complicated by the fact that the outer tank must be built around the inner tank, and once the tank walls are completed, certain of the weld seams of the structure may not be inspected and tested.

Other known methods of transporting liquified gas on a vessel include the so-called "integrated" or membrane tank structure wherein the cargo tank is constructed of light or thin material not intended to be loaded appreciably in its own plane, and which contains the cargo by transmitting the cargo pressure normally (perpendicular to the membrane) to the hull structure. Such tank structures are double walled (primary cargo barrier plus secondary barrier) cargo containing systems. Still other liquified gas containment systems are such that the secondary or emergency backup cargo tank is made an integral part of the ship hull itself and the primary cargo tank is independent of the ship's hull, but supported by the hull.

It should be noted that all of the liquified gas containment systems discussed thus far are made up of a primary barrier (or cargo tank which contains the lading during normal operating conditions) and a secondary barrier, external to the primary barrier. The secondary barrier is provided and designed so that it should be able to safely contain the contents of the primary barrier in the event of failure of the primary barrier, thus protecting the ship's hull from brittle fracture. Such dual systems are difficult to build and require inordinate amounts of time spent at the building dock or way to accommodate the tank construction. Further, variations in the mounting structures and the specific dimensions and the various mounting connections cause eccentric and uneven forces to be applied to the tank, thereby producing undesirable stress concentration therein. These stresses substantially increase the dangers of structural failure of the tank. The concentrated stresses are generally located at an interface between the tank and the support structure, and the generally eccentric connections between the tank and the supporting structure result in uneven forces applied to the tank and in uneven areas of stress concentrations within the tank wall. Because of these stress concentrations a leak or puncture in the tank wall may well result in immediate catastrophic failure of the tank. If the cargo being carried is a liquified gas, such a failure would release the liquid into the hull, causing an almost immediate brittle failure of the hull structure, were it not for the presence of the secondary barrier which contains the leakage and protects the hull.

Accordingly, it is an object of the present invention to transport liquified gas in a marine vessel which is relatively simple and inexpensive in construction.

Another object of the invention is to transport liquified gas in a single walled pressure vessel type tank, without the need for a liquid containing secondary barrier, but with a liquid deflecting thermal spray shield.

Another object of the invention is to predetermine the stresses to which all parts of a cargo tank for liquified gas are subjected during all service conditions and modes of operation.

It is another object of the invention to provide an integrated transportation system (of ship's hull and cargo tank) for liquified gas in which the stresses to which the system is subjected are accurately predetermined in those areas which influence cargo containment.

Yet another object of the invention is to minimize stress concentrations within the walls of the cargo tank.

Another object of the invention is to predetermine the probability of occurrence of, the maximum size of, and the growth rate of defects or flaws, such as hairline weld cracks, in the tank system, and by the use of fracture mechanics, ascertain and ensure that any such defects or flaw possible in the tank system may not lead to major or catastrophic failure of the tank without such failure having been [preceeded] *preceded* by a very lengthy period of minor, slow gas discharge and local liquid spray from the point of inception of the defect or flaw.

An object of the invention is to ensure, through the determinate integration of (1) tank system stress analysis, (2) tank system material fracture mechanics analysis, and (3) tank system quality control, that the liquified gas containment system is a "fail safe" or "leak before catastrophic failure" type system.

In accordance with an aspect of this invention, a cargo tank is provided with an integral annular ring forming a section of the tank, preferably in the equatorial plane thereof. The ring is wider than the tank walls and accordingly a portion thereof extends outwardly from the outer surface of the remainder of the tank. This extension portion is adapted to be secured to a foundation structure, integrally connected to the hull structure, to provide support for the tank and to minimize and substantially eliminate the concentration of stresses in the walls of the tank itself. By the accurate and generally tangential securement of the foundation structure to the pressure vessel cargo tank, the stresses within the tank may be accurately predetermined with the utilization of such known factors as the static and dynamic forces to which the tank is subjected during an ocean voyage, such that the tank and interface structure may be selected so that the tank will merely gas leak and then liquid spray leak if the wall is cracked, while, due to the stress determinacy of the tank system, the possibility of catastrophic failure is eliminated. This analysis may be made before construction of the tank and interface structure begin so that the interface structure may be fabricated in an area removed from the point of assembly of the vessel and tank may later be integrated into the tank and vessel. The accurate securement and positioning of the ring or interface structure with respect to the foundation support system also permits the predetermined forces to be used to calculate the stress patterns within the interface structure so that the entire support system can be designed to produce minimum stress concentration within the interface structure and the tank itself.

Since a single walled vessel is utilized as a cargo tank, and since the interface structure and the foundation are relatively simple members and are constructed to facilitate non-destructive testing of the tank, foundation and connections therebetween, whereby the stress to which the tank and support structure will be subjected can be readily determined and documented, the safety requirements of the various regulatory bodies are met and no outer gross liquid containing secondary barrier type safety tank is required.

A liquid spray protector is installed between the cargo tank and those parts of the adjacent hull structures which could be sub-cooled by spray gas or spray liquid leakage from a minor defect, such as a crack, in the tank. This protector is installed so as to deflect sprayed cargo liquid downward and inboard to the tank top below the cargo tank, from whence liquid accumulations are removed.

The above, and other objects, features and advantages of this invention, will be apparent in the following detailed description of illustrative embodiments thereof which embodiments are to be read in connection with the accompanying drawings wherein.

Figure 1:
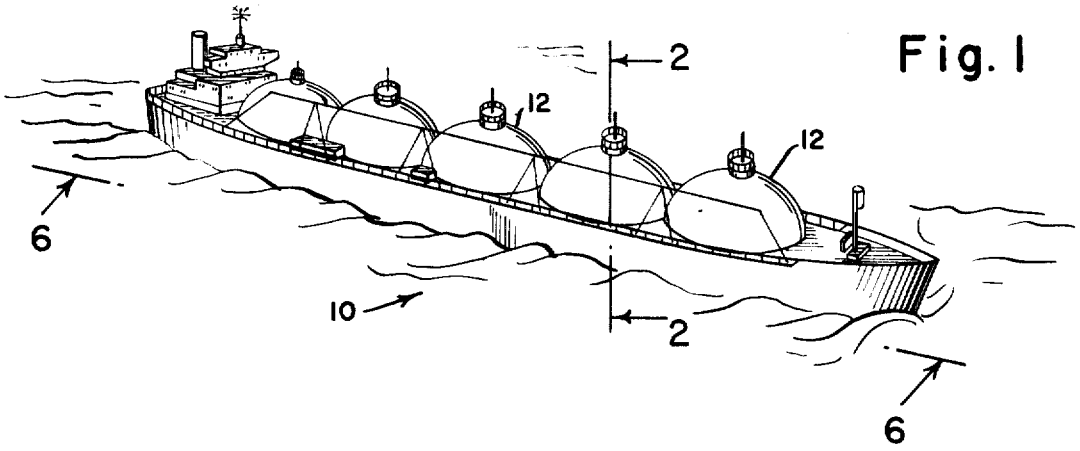
FIG. 1 is a perspective view of a ship of a type in which the present invention may be employed.
Figure 2:
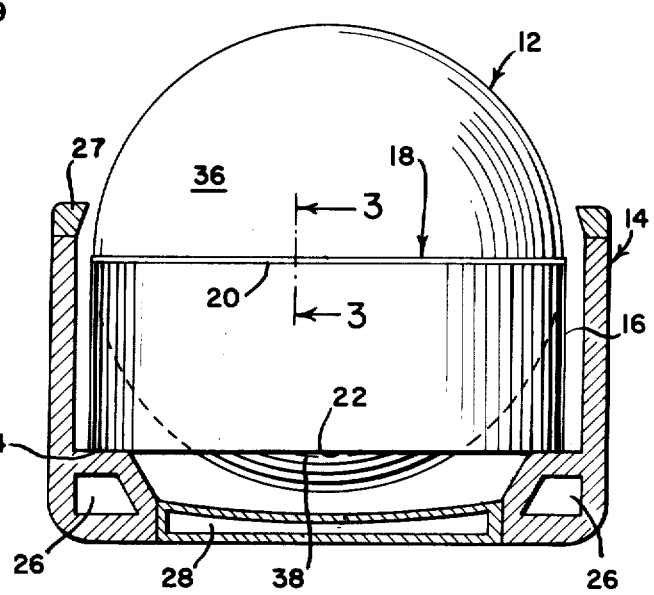
FIG. 2 is a schematic view partly in section taken on lines 2—2 of FIG. 1 showing one embodiment of the tank support system utilizing interface structure in accordance with the present invention.

Referring to the drawing in detail, and initially to FIG. 1 thereof, it will be seen that a ship 10, of the type in which the present invention may be employed, contains five spherical tanks 12 of which are mounted in the ship's hull and which are adapted to contain liquified gas, such as for example methane, ethylene, propane and chlorine. It is noted that while in the illustrative embodiment of this invention, only five tanks 12 have been illustrated, it is contemplated that more or less of such tanks may be provided in making vessels to meet varying operational requirements.

Tanks 12 are formed by plate construction, preferably by utilizing full penetration welding which is readily subjected to non-destructive testing. Such tanks are readily fabricated to the high standards required in the shipbuilding industry and they may constitute pressure vessels which may be adapted to contain liquified gas at moderate pressures, as for example a few atmospheres.

Tanks 12 are directly mounted to hull 14 of ship 10 by foundation skirt structure 16 which is joined to tank 12 by means of an interface structure 18, more fully described hereinafter. Skirt 16 is formed of a plurality of plates welded together, again preferably by full penetration welding, to form an integral annular support structure which is welded at its top edge 20 to interface structure 18 at approximately the equatorial plane of tank 10. Opposed edge 22 of skirt 16 is welded directly to hull structure 24 of ship 10 and thus an integral structure is formed including hull structure 24, skirt 16 and tank 12.

In the preferred embodiment of the present invention a spherical tank is used since the volumetric efficiency of the tank is at a maximum as compared to the other tanks, and since the tank occupies a minimum amount of space in the ship's hull.

Figure 3:
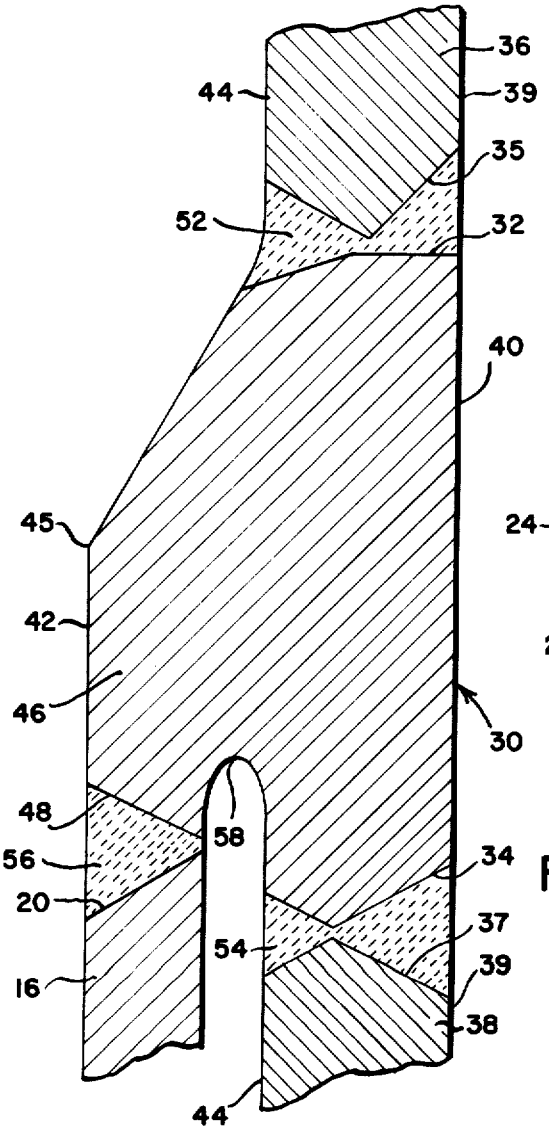
FIG. 3 is a sectional view taken on lines 3—3 of FIG. 2.

Interface structure 18, more clearly illustrated in FIG. 3, comprises an annular ring 30 positioned at the equatorial plane of tank 12 and is welded at its opposed edges 32 and 34 to beveled edges 35 and 37 of upper and lower hemispherical tank wall 36 and 38 respectively. The inside surface 40 of ring 30 is aligned with the inside surface 39 of hemispheres 36 and 38 and forms an integral part of the tank itself. Ring 30 is substantially wider than tank section 36 and 38 whereby its outer surface 42 extends substantially beyond the outer surface 44 of tank sections 36 and 38. In this manner an extension portion 46 is provided which has a lower surface 48 that is welded, preferably by full penetration welding, to beveled upper edge 20 of skirt 16 to provide complete support of tank 12 throughout its entire peripheral extent.

During construction, tank sections 36 and 38 are joined to annular ring 30 and annular welds 52, 54 therebetween are readily tested and proved, the tank is mounted on foundation skirt 16 and secured thereto by weld 56, which is thereby positioned for non-destructive testing and inspection.

The support system thus formed by interface structures 18 of the present invention is stress determinant, that is, since tank 12 is integrally secured to hull structure 24 of ship 10, the stresses transferred between the tank and hull structure, due to the stresses to which the ship is subjected and to the thermal stressed produced in the loading and unloading the tank 12, may be accurately determined. The accurate determination of the stresses is achieved due to the accurate and specific connection of the skirt of the interface structure of the tank. Specifically, since the point of connection of skirt 16 with interface structure 30 is accurately known and since it is substantially tangential to the tank itself, the stresses to which that tank will be subjected may be accurately determined prior to installation of the tank within the ship. Thus, the tank and its support system may be accurately designed to transmit minimum stresses to the tank itself so that in the event of a tank leak, catastrophic failure thereof will not occur.

The integral connection of skirt 16 with the ship's hull also provides added rigidity to the hull, thereby increasing the hull's capability to withstand torsional and rotational loads due to wind and wave forces and thereby also decreasing the stresses transmitted to tank 12. However, the relatively large height of skirt 16 provides a degree of elastic stress distribution which is beneficial for structural response to hull movement.

Further, due to the accurate connection between skirt 16 and interface structure 30, the stress levels and variations resulting from thermal movement, i.e. thermal contractions and expansions of the tank during loading and unloading may also be accurately determined and designed for. By the use of the stress determinant tank and support system of the present invention, it is possible to accurately document the stress levels of the structure so that the safety requirements of the various international shipbuilding regulatory bodies, and in particular the normal requirements concerning the need for a second protective tank can be satisfied, and such a second liquid containing tank may be eliminated in favor of a minor spray protection system.

Ring 30 is provided with groove 58 which extends circumferentially about the lower portion of the ring and defines the location of extension 46. Groove 58 may have a variety of shapes and the preferred shape is determined by performing a stress analysis to calculate the expected locations and amplitudes of stress within ring 30. The specific configuration of the groove is determined to provide a minimum of stress concentration within ring 30 and a minimum of stress transferral from skirt 16 to tank 12. In the preferred embodiment the optimum shape of groove 58 is semi-elliptical and opening away from the interface structure. It should be noted, however, that since the shape of ring groove 58 is determined from an analysis of the forces on the ring, the optimum shape of this groove may vary as the dimensions and design of ring 30 changes. For example, different forces may be applied to ring 30 if either the shape of the tank or skirt is changed. It is also noted that the outer surface 44 or ring 30 may be evenly beveled throughout its circumferential extent from a point 45 to the surface of hemisphere 36, thereby to provide smooth stress transmittal between the two members, and prevent stress concentration.

Figure 4:
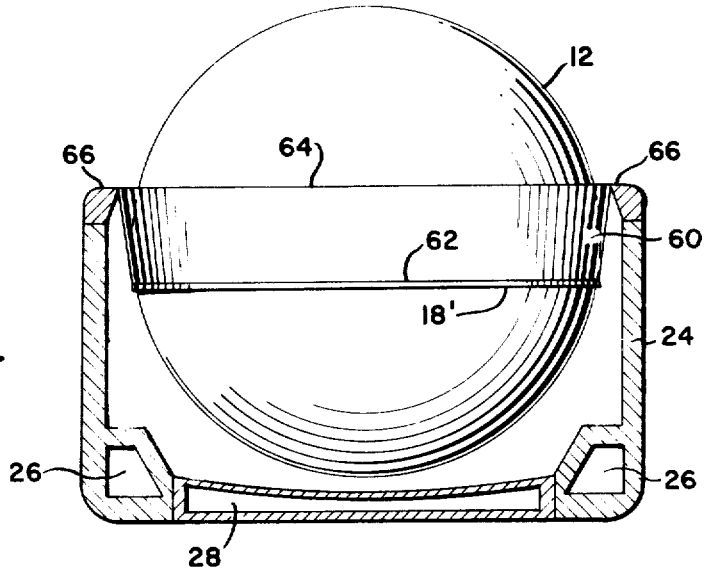
FIG. 4 is a view, similar to FIG. 2, of another embodiment of a tank support system adapted to use an interface structure in accordance with the present invention.

While skirt 16 has been described as a generally cylindrical member secured to the lower portion of hull structure 24, it is contemplated that other structural arrangements may be utilized to advantage with the interface structure of the present invention. For example, as illustrated in FIG. 4, a skirt 60 is provided which is secured along one edge 62 thereof to interface structures 18′ at approximately the equatorial plane of tank 12. However, in this embodiment, skirt 16 is generally a frustro-conical member having its base edge 64 secured to the upper areas 66 of hull structure 24, so that the tank 12 is suspended from the hull structure rather than seated thereon as is the case in the prior embodiment. Interface structure 18′ in this embodiment is substantially the same as interface structure illustrated in FIG. 3 except that the structure is inverted, i.e. groove 58 opens upwardly so that and surface 48 of extension 46 are presented upwardly for connection with skirt 16, and in frustro-conical shape rather than a cylindrical shape.

While the above described interface structures have been illustrated for use in conjunction with generally spherical tanks, it is noted that the present invention is not limited to that particular construction and that the interface structure of the present invention applies equally well to tanks formed of/or combinations of various shapes, and in particular to tanks having curvilinear peripheral wall portions, such as cylindrical, conical, elliptical or even egg-shaped tanks. In any of these case skirt 16 will be secured to the interface structure as aforesaid and its configuration will be in conformity with the configuration of the associated tank.

Figure 5:
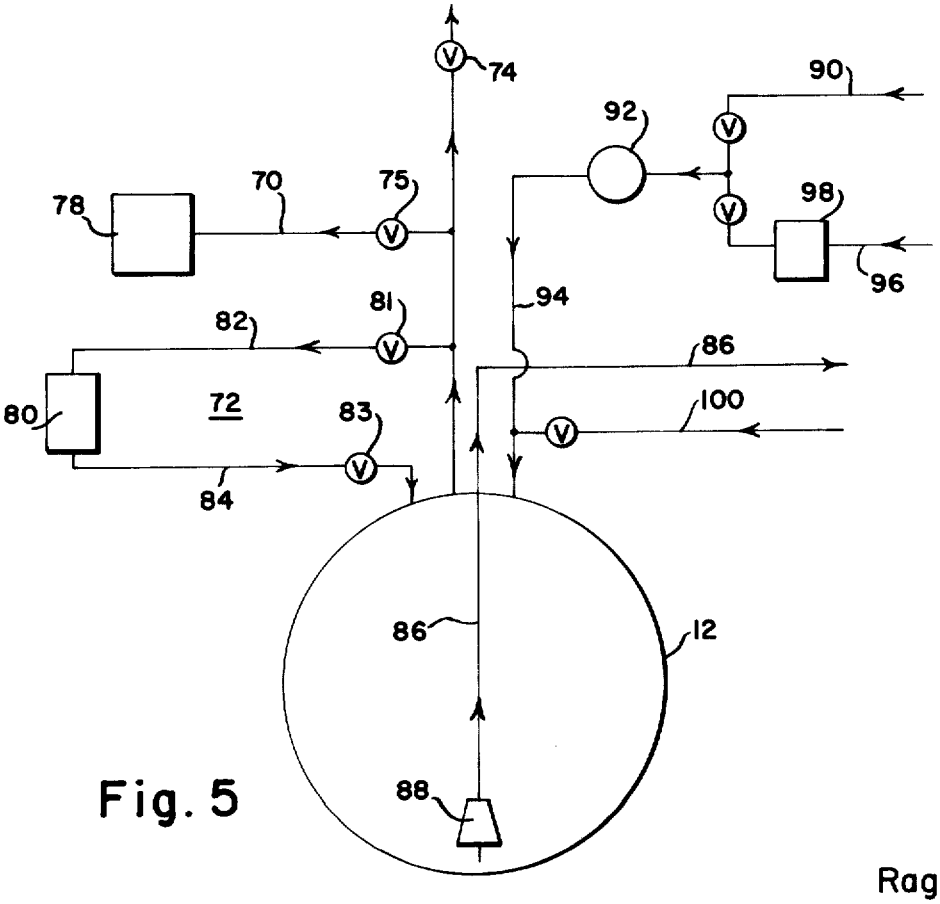
FIG. 5 is a schematic diagram illustrating a refrigeration system adapted for use in conjunction with the present invention.
Figure 6:
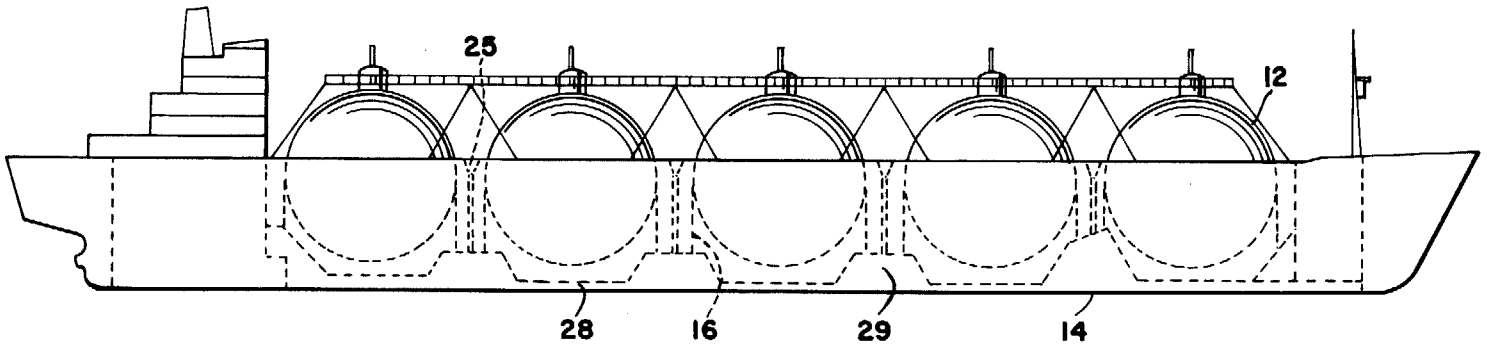
FIG. 6 is a longitudinal sectional view taken on line 6—6 of FIG. 1.

Loading of each of the tanks 12 in the previously discussed embodiments may be initiated by spray nozzles (not shown) which are adapted to spray the interior surfaces of the tank with liquified gas before the bulk of the cold liquid is introduced. In this way the tank is slowly cooled in order to eliminate any possible failures by thermal shock by contact of the extremely cold liquified gas with the tank walls which are at ambient temperatures. Referring to FIG. 5 of the drawings, a refrigeration system which is utilized to control the temperature of the gas after loading, is illustrated. As seen therein, two refrigeration systems 70, 72 either or both of which may be used in a ship constructed in accordance with the present invention, are provided.

System 70 utilizes the evaporation of liquified gas in tank 12 to keep the gas at a low temperature. In this system, as the liquified gas evaporates within tank 12 it absorbs heat of vaporization from the surface of the enclosed liquid, thus maintaining the low temperature of the liquid therein. After evaporation, the gas is discharged from tank 12 either through pressure relief valve 74 in discharge line 76 to the atmosphere or through gas control valve 75 in discharge line 76 to the ship's boilers or propulsion system 78, for use as fuel therein. The evaporating gas absorbs enough heat in this system to cool the liquified gas to a temperature below its condensation temperature.

The second refrigeration system 72 which may be employed to refrigerate the liquified gas within the tank 12 requires utilization of a two or three stage refrigeration system 80. The evaporated gas within 12 is withdrawn from the top thereof, through valve 18, liquified by the refrigeration system, and returned to the tank through valve 83. As seen in the drawing, the vaporous gas is taken from the top of tank 12 through conduit 76 and 82 to the two stage refrigeration system 80, which may be of conventional construction, and which converts the vaporous gas back to its liquid phase. The resulting liquid is then returned to tank 12 through line 84. Since this refrigeration system requires relatively heavy, complex, and expensive equipment, it is utilized only for the more expensive gases such as ethylene, which gases do not require the extremely low temperatures (as for example less that −160° F) that are necessary to maintain other gases in their liquid state.

Normally liquified gas within tank 12 will be unloaded through conduit 86 by pump 88, while gas vapor is returned from shore through conduit 100 to maintain a positive pressure in the tank as liquid is removed. However, in case of failure of pump 88, alternative methods are available for unloading. In one of these methods gas is drawn from another cargo tank or from ashore through conduit 90 and pumped through compressor 92 into the cargo tank through conduit 94. Alternatively, liquid may be withdrawn from another cargo tank or from ashore through conduit 96, vaporized in heat exchanger 98 and passed through the compressor to the cargo tank. Both of these systems pressurize the tank several atmospheres and force the liquified gas out of the tank through conduit 86. Heater 98 may also be utilized during normal loading and unloading operations to prevent the formation of a vacuum in the tank as liquified gas is unloaded, thereby maintaining at least a pressure balance on either side of the tank with the atmosphere.

Although illustrative embodiments of the invention have been described herein with reference to the accompanying drawings, it is to be understood that the invention is not limited to those precise embodiments and that various changes and modifications may be effected therein by one skilled in the art without departing from the scope or spirit of this invention.

What is claimed is

1. In a cargo tank *having at least one curvilinear peripheral surface and being* adapted to contain liquified gas [and which is], *said tank being* mounted by a supporting structure extending tangentially to the tank in a marine vessel for transportation thereby or for storage, means for connecting said tank to said [support] *supporting* structure, comprising, a one piece peripheral support member integral with and forming an annular portion of said tank [and] *at said curvilinear peripheral surface, said support member* having [a] *an inner surface which forms a portion of the inner surface of the tank and an extension* portion extending beyond said tank for operative connection with said [support] *supporting* structure tangentially of the tank*; said supporting structure comprising an integral skirt having opposed ends respectively rigidly secured to said extension portion of the support member and to the hull structure of the vessel; thereby eliminating the need for the secondary barrier normally used with LNG cargo tanks.*

[2. Apparatus as in claim 1 wherein said cargo tank has at least one curvilinear peripheral surface and said support member is located at said surface.]

3. Apparatus as in claim [2] *1* wherein said cargo tank is a sphere[, said supporting structure is an integral skirt secured to the hull structure of said vessel] and said support member comprises an annular ring[, one surface of which forms a portion of the wall of the tank].

4. Apparatus as in claim [2] *1* wherein said support member has a groove therein, said groove extending parallel to the adjacent periphery of said tank and defining [a] *said* support member extension [adapted to be] *portion rigidly* secured to said [support] *supporting* structure.

5. Apparatus as in claim [2] *1* wherein said cargo tank is a sphere[, said supporting structure is an integral skirt secured to the hull structure of said vessel] and said support member comprises an annular ring [having] *including said extension portion, which extension portion is integral with said support member and comprises* an integral annular support extension substantially parallel to the adjacent peripheral surface of said tank, said *annular support* extension providing a support surface for operative end abutting connection with *one end of* said [support structure] *skirt* and being positioned in a predetermined spaced location with respect to the remainder of said support member and said tank whereby stresses in said tank are adapted to be predetermined.

6. Apparatus as in claim 5 wherein said tank is a pressure vessel of plate construction and said support member is an independent annular member welded to said tank and forming a portion thereof.

7. Apparatus as in claim 6 wherein said support member is located at the equatorial plane of said cargo tank.

8. Apparatus as in claim 5 wherein said extension is defined by an annular groove formed in said support member along a path generally parallel to said tank.

9. Apparatus as in claim 8 wherein said groove has a generally semi-elliptical cross-sectional configuration, said semi-elliptical groove opening away from said support member.

10. Apparatus as in claim 8 wherein said support member includes an annular surface beveled towards said tank.

11. In a cargo tank having at least one horizontal circular dimension and adapted to contain liquified gas, which tank is mounted by a supporting structure, extending tangentially of said tank, on a marine vessel having refrigeration means associated therewith for maintaining said gas in its liquid phase, means for connecting said tank to said support structure, comprising a one piece horizontal annular section of said tank having an exterior dimension and section which defines an extension located in tangential relation to said tank for operative end abutting connection to said [support member] *supporting structure; said supporting structure comprising an integral skirt having first and second opposed ends, with said first end thereof rigidly connected to said extension and said second end rigidly connected to the hull structure of the vessel; thereby eliminating the need for the secondary barrier normally used with LNG cargo tanks.*

12. Apparatus as in claim 11 wherein said horizontal annular section comprises an annular ring welded to the remainder of said cargo tank.

13. Apparatus as in claim 12 wherein said ring includes an annular groove adjacent the periphery of said tank, said groove defining said extension.

14. Apparatus as in claim 13 wherein said groove has a semi-elliptical configuration, and said configuration opens away from said ring.

15. In a cargo tank adapted to contain liquified gas and which is mounted by a supporting structure, extending tangentially of said tank, on a marine vessel for transportation thereby, *or for storage,* means for connecting said tank to said support structure comprising a one-piece peripheral support member integral with and forming a portion of said tank, said support member having a greater width than adjacent sections of said tank whereby a portion of said support member extends beyond and in tangential relation to said tank for operative end abutting connection with said [support] *supporting* structure*; said supporting structure comprising an integral skirt having first and second opposed ends, with said first end thereof rigidly connected to said extension and said second end rigidly connected to the hull structure of the vessel.*

16. In a cargo tank having at least one horizontal circular dimension and adapted to contain liquified gas, which tank is mounted by a supporting structure, extending tangentially of said tank, on a marine vessel having refrigeration means associated therewith for maintaining said gas [at] *in* its liquid phase, means for connecting said tank to said [support] *supporting* structure comprising a one piece horizontal annular section of said tank having an interior dimension substantially equal to the interior dimensions of adjacent portions of said tank and having an exterior dimension greater than the exterior dimensions of adjacent portions of said tank whereby said tank section defines an extension located in tangential relation to said tank for operative end abutting connection to said support member.

*17. In a marine vessel for transporting or storing liquified gas and having a hull structure, a spherical tank adapted to contain liquified gas, an annular skirt tank supporting structure having upper and lower edges and a diameter slightly larger than the diameter of said tank, said lower edge of the skirt being rigidly secured to the hull of said vessel; said tank including a one piece horizontal annular section for connecting the tank to the upper edge of said skirt, said annular section having an interior dimension substantially equal to the interior dimensions of adjacent portions of the tank to define a substantially smooth uninterrupted inner surface in the tank and also having an exterior dimension which is greater than the exterior dimensions of adjacent portions of the tank, whereby a portion of said annular section extends beyond the exterior of adjacent portions of the tank, said annular section also having an annular downwardly opening groove formed therein located exteriorly of the tank to define an exterior extension portion of the annular section located in tangential relation to the tank, said exterior extension portion being rigidly connected in end abutting relation to said upper end of the annular skirt tank supporting structure, whereby said tank is supported by said skirt on the hull of the vessel through rigid connections and the stresses to which the tank and annular section will be subjected can be predetermined.*

*18. In a tank for liquified gas having at least one horizontal curvilinear dimension and being adapted to contain liquefied gas, which tank is mounted by a supporting structure extending tangentially of said tank on a marine vessel for transportation or for storage thereby, means for connecting said tank to said supporting structure comprising a one piece peripheral support member integral with and forming a portion of said tank, said support member having an inner surface forming a portion of the inner surface of the tank and forming a continuous extension of adjacent portions of the tank, said adjacent portions of the tank on opposite sides of said support member being in alignment with each other to define a substantially smooth inner surface in the tank at the support member; said support member having an outer surface and a width dimension between said inner and outer surfaces that is greater than the width dimension of adjacent sections of the tank whereby said support member defines a support extension portion located outwardly of any adjacent portion of the tank and in tangential relation thereto for operative end abutting connection with said supporting structure, said support member also having an annular semi-elliptical groove formed therein adjacent the periphery of said tank, opening away from the support member and towards the supporting structure.*

* * * * *